March 27, 1956 — P. BONNAFOUX — 2,739,546
PELLET MILL
Filed April 23, 1953 — 2 Sheets-Sheet 1
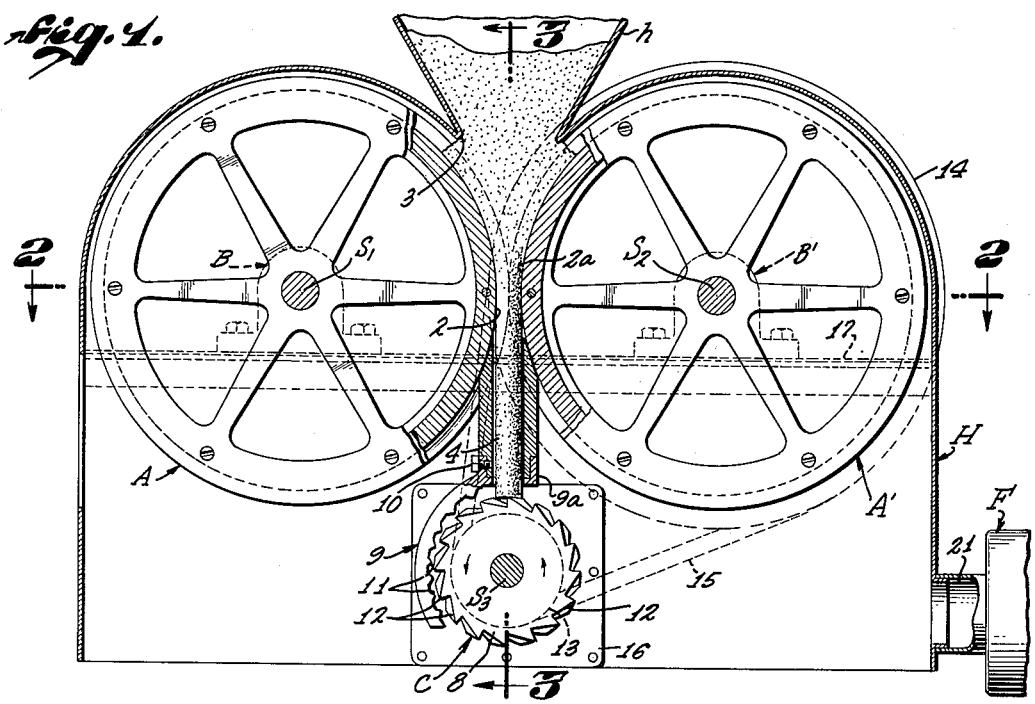
Fig. 1.
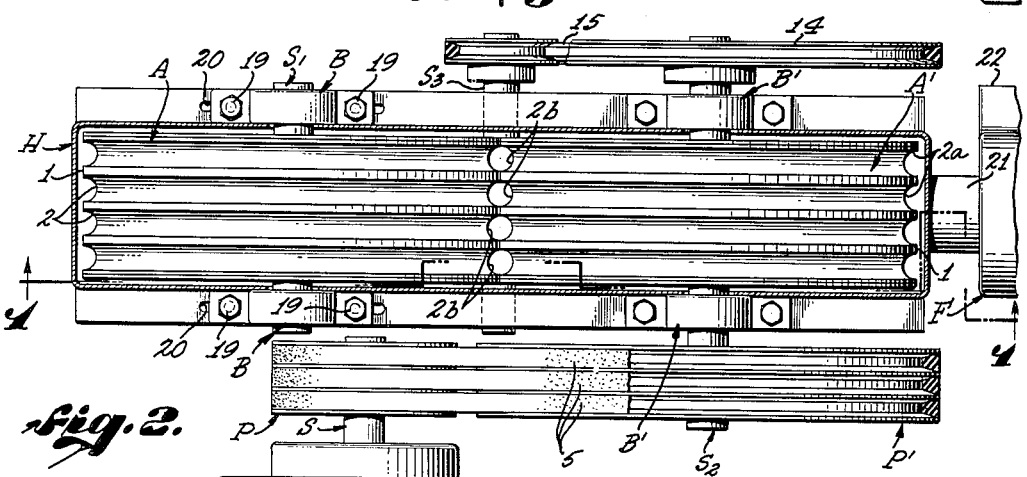
Fig. 2.
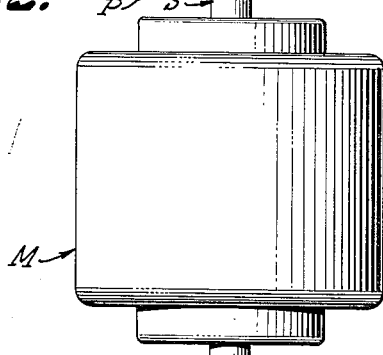
PAUL BONNAFOUX,
INVENTOR.
BY
ATTORNEY.

March 27, 1956 P. BONNAFOUX 2,739,546
PELLET MILL
Filed April 23, 1953 2 Sheets-Sheet 2
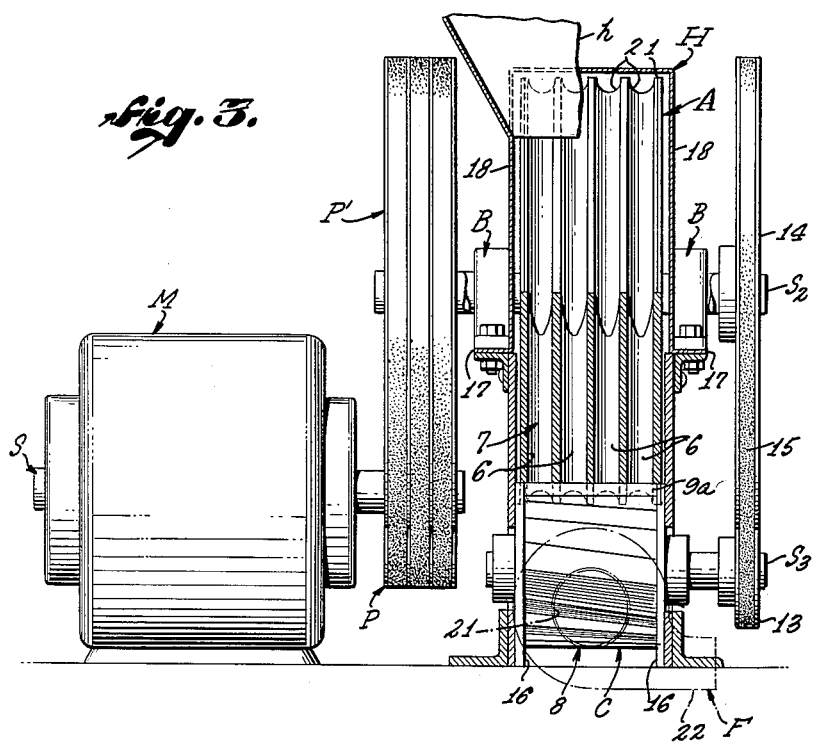
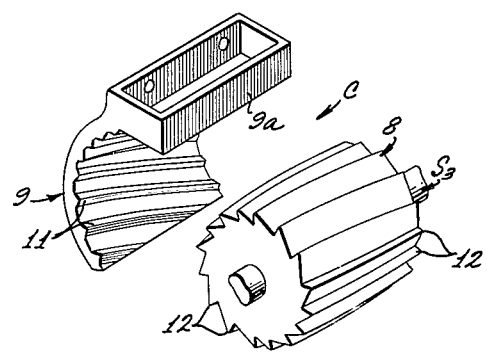
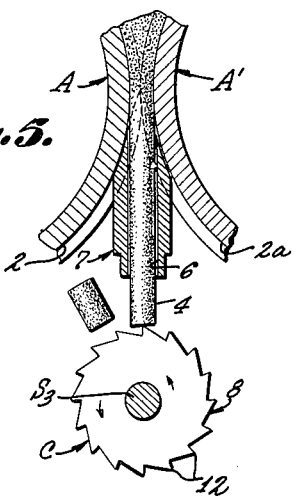
PAUL BONNAFOUX,
INVENTOR.
BY
ATTORNEY.

United States Patent Office 2,739,546
Patented Mar. 27, 1956

2,739,546

PELLET MILL

Paul Bonnafoux, Lancaster, Calif.

Application April 23, 1953, Serial No. 350,730

10 Claims. (Cl. 107—10)

This invention relates to and has for an object the provision of a mill for the same purpose but of a different type from that forming the subject matter of an application for patent filed by me on March 16, 1953, Serial No. 342,638.

Whereas pellet mills heretofore used for food in the form of molded pellets, for animals, have required extrusion of the plastic food product through peripheral apertures in circular dies under high pressure, generally from inside the dies outwardly, but in the mill of my said previous application from the outside of the dies inwardly, and in either case cut or broken into short cylindrical pellets for mixture with other food or enriching elements and water, to provide a mash for feeding to animals. In said former mills, due to the high speed and high pressures necessary to operate the mill efficiently and economically, accuracy and precision were required in mounting the parts of the mill, and despite extreme care, excessive vibration was usually unavoidable. It is, therefore, an important object of this invention to quite completely obviate and substantially reduce the objectionable features of previous mills, as well as to actually eliminate some objectionable features, such as excessive noise and vibration, and at the same time provide a mill of extreme simplicity, convenience, maximum output and economy, wherein the heated and moistened food is fed between and molded by a pair of mating wheels having complementary peripheral grooves of semicircular cross-section circumferentially extended around the wheel rims and in and between which grooves the material is molded into straight rod-like sections as the wheels are rapidly rotated with their rims in contact.

Another object is to provide a simple but effective cutter for severing fragments of the molded rod from the lower end of the rod as it is continuously being formed and extended to a point adjacent the cutter.

A further object is to provide a housing in which the molding wheels are enclosed, and wherein the severed fragments are collected for withdrawal and final disposition.

A still further object is to provide suitable induced draft means for withdrawing the pellet fragments from the housing and conducting the same to desired points of bogging, packaging, or delivery to points of distribution.

Other objects may appear as the description progresses.

I have shown a preferred embodiment of the invention in the accompanying drawings, in which, Fig. 1 is an elevational sectional view on line 1—1 of Fig. 2;

Fig. 2 is a sectional view on line 2—2 of Fig. 1;

Fig. 3 is an elevation in section on line 3—3 of Fig. 1;

Fig. 4 is a perspective exploded view of the cutter elements; and

Fig. 5 is a sectional view of the cutter unit in the plane of Fig. 1, but without the non-rotatable cutting elements.

The type of mill illustrated includes as major elements a pair of molding wheels A and A' borne by spaced parallel shafts $S_1$ and $S_2$ respectively, in a housing H and adapted to be driven from a motor M as by means of a plural grooved driving pulley P on a motor spindle S, a similarly grooved driven pulley P' on shaft $S_2$ and belt 5, 5, as shown, or optionally on shaft $S_1$ so that when one shaft $S_1$ or $S_2$ is power driven, frictional contact between the rim 1 of wheel A with rim 1a of wheel A' will correspondingly drive the other wheel.

The rims 1 and 1a of wheels A and A' respectively, are correspondingly grooved circumferentially at 2 and 2a of semicircular cross-section so that when the rims are aligned and frictionally engaged as shown in Fig. 2, said grooves form circular cavities 2b between the two wheels which are disposed vertically beneath the throat 3 of a hopper h, to which material in a plastic state is supplied by suitable means not a part of this invention, for compression and formation into elongated cylindrical rod-like bodies 4 by wheels A and A'. The formed rods 4 are pressed downwardly through bores 6 in a central vertical guide 7, below which a cutting unit C is mounted and includes a rotatable cutter 8 borne by a countershaft $S_3$ and a stationary cutter plate 9 affixed at its head 9a to the lower end of guide 7 as by means of screws 10. The upper end of the vertical guide 7 has its opposite edges disposed in contiguity to the grooves in the wheels A and A' so that it will strip material in a plastic state from said grooves. Member 9 is of arcuate form so as to partly surround cutter 8, and has teeth or ribs 11 which cooperate with the teeth 12 of cutter 8 to grind and reduce portions of the rod 4, which are severed by cutter 8 to smaller and more readily miscible fragments as main constituents of a food mash.

Cutter shaft $S_3$ carries a driven pulley, and shaft $S_2$ (as shown) carries a larger driving pulley 14 which is operatively connected with pulley 13 by a belt 15.

Cutter unit C may include a plate 16 adapted to be secured to a side wall of housing H in such a manner as to support shaft $S_3$ or may be otherwise mounted.

Housing H has horizontal flanges 17, 17 on opposite sides 18, 18 thereof, on which the bearings B or B' are supported and are suitably adjustable as by means of bolts 19 in elongated slots 20 for varying the spacing of shafts $S_1$ and $S_2$ as may be at times necessary to maintain wheels A and A' in frictional contact.

A motor driven induced draft fan F has its inlet 21 connected with the interior of housing H at one end of the housing, and its outlet connects with a conduit 22 for conveying the withdrawn contents of housing H to desired points of further disposition.

It is apparent that while it may be preferable to provide the wheels A and A' of identical size and form as shown, it is only necessary that they rotate at the same perpiheral speed so as to maintain driving contact between the reins thereof. Although not deemed necessary, the shafs $S_1$ and $S_2$ may be gear connected and thereby positively instead of frictionally driven.

I claim:

1. A pellet mill comprising: a housing having an inlet for moldable material and an outlet for treated material, a pair of mating and circumferentially grooved molding wheels rotatably mounted in said housing, each of said wheels having a plurality of grooves aligned and juxta- posed with the grooves of the other wheel at a point adjacent said material inlet so as to receive and form the material into rod-like sections under pressure due to the impingement of said wheels, a guide supported below the junctions of the mating grooves of said wheels, having cavities for receiving the formed rods and its upper end engaging said wheels for scraping the same, and a cutter unit disposed below said guide and having a rotatable cutter adapted to grind successive portions of said rods for subsequent treatment to provide a desired food product.

2. A pellet mill comprising: a housing having an inlet for moldable material and an outlet for treated material, a pair of mating and circumferentially grooved molding wheels rotatably mounted in said housing, each of said wheels having a plurality of grooves aligned and juxtaposed with the grooves of the other wheel at a point adjacent said material inlet so as to receive and form the material into rod-like sections under pressure due to the impingement of said wheels, a guide supported below the junctions of the mating grooves of said wheels, having cavities for receiving the formed rods and its upper extremity disposed in scraping relationship with said wheels, and a cutter unit disposed below said guide and having a rotatable cutter adapted to sever successive portions of said rods for subsequent treatment to provide a desired food product, said cutter having peripheral teeth, and a relatively stationary arcuate toothed plate between which and the cutter the severed portions of said rod are abraded and reduced to smaller fragments to provide the end product of the mill.

3. A pellet mill comprising: a housing having an inlet for moldable material and an outlet for treated material, a pair of mating and circumferentially grooved molding wheels rotatably mounted in said housing, with their grooves aligned and juxtaposed at a point adjacent said material inlet so as to receive and form the material into rod-like sections under pressure due to the impingement of said wheels, a cutter unit mounted immediately below the bite of said wheels, said cutter unit including a continuously rotatable, uni-directional cutter and a grinding plate mounted adjacent said cutter for comminuting said sections, said plate and cutter having co-operating teeth for comminuting said sections a prime mover, and means for operatively connecting said wheels and said cutter unit with the prime mover.

4. A pellet mill comprising: a housing having an inlet for moldable material and an outlet for treated material, a pair of mating and circumferentially grooved molding wheels rotatably mounted in said housing, each of said wheels having a plurality of grooves aligned and juxtaposed with the grooves of the other wheel at a point adjacent said material inlet so as to receive and form the material into rod-like sections under pressure due to the impingement of said wheels, said wheels having annular circumferential ribs alternating with said grooves and frictionally engaged to drivingly connect the two wheels, and a guide member disposed immediately below the bite of said wheels and having a plurality of openings therein, said guide member having scraper means at its upper end for separating said rod-like sections from said wheels.

5. In a pellet mill, the combination of: a housing having an inlet for moldable material and an outlet for treated material; a pair of circumferentially grooved rollers having their grooves in registry; and a cutter unit disposed below the bite of said rollers having a uni-directionally rotatable cutter member whose axis of rotation is normal to and passes through a line vertical to said bite, and a cutter plate mounted adjacent said member for comminuting material cut by said member, said member and said plate having co-operating protrusions to accomplish such comminution.

6. In a pellet mill, the combination of: a housing having an inlet for moldable material and an outlet for treated material; a pair of circumferentially grooved rollers having their grooves in registry; a cutter disposed below the bite of said rollers having a rotatable cutter member whose axis of rotation is normal to and passes through a line vertical to said bite, said rotatable cutter member having protrusions thereon; and an arcuate, demountable cutter plate mounted adjacent said rotatable member and provided with protrusions co-operative with said protrusions on said rotatable cutter member.

7. In a pellet mill, the combination of: a housing having an inlet for moldable material and an outlet for treated material; a pair of circumferentially grooved rollers having their grooves in registry; a treated material guide having its upper end disposed immediately below the bite of said rollers; and a cutter disposed below said guide including a rotatable cutter member having projecting teeth and a demountable cutter plate secured adjacent said member and having projections extending toward the teeth of said cutter to grind said treated material.

8. In a pellet mill, the combination of: a housing having an inlet for moldable material and an outlet for treated material; a pair of circumferentially grooved rollers having their grooves in registry; a treated material guide having its upper end disposed immediately below the bite of said rollers, said upper end having scraper means thereupon engageable with the grooves in said rollers; and a cutter disposed below said guide including a rotatable cutter member having projecting teeth and a demountable cutter plate secured adjacent said member and having projections extending toward the teeth of said cutter to grind said treated material.

9. In a pellet mill, the combination of: a housing having an inlet for moldable material and an outlet for treated material; a pair of circumferentially grooved rollers having their grooves in registry; a treated material guide having its upper end disposed immediately below the bite of said rollers; and a cutter disposed below said guide including a unidirectionally rotatable cutter member having projecting teeth and a demountable, arcuate cutter plate secured adjacent said member and having projections extending toward the teeth of said cutter to grind said treated material.

10. In a pellet mill, the combination of: a housing having an inlet for moldable material and an outlet for treated material; a pair of circumferentially grooved rollers having their grooves in registry; a treated material guide having its upper end disposed immediately below the bite of said rollers, said upper end having scraper means thereupon engageable with the grooves in said rollers; and a cutter disposed below said guide including a unidirectionally rotatable cutter member having projecting teeth and a demountable, arcuate cutter plate secured adjacent said member and having projections extending toward the teeth of said cutter to grind said treated material.

References Cited in the file of this patent

UNITED STATES PATENTS

| Number | Name | Date |
| --- | --- | --- |
| 583,024 | Boyer et al. | May 25, 1897 |
| 1,720,097 | Scholz | July 9, 1929 |
| 2,144,720 | Gibson | Jan. 24, 1939 |
| 2,186,415 | Haworth | Jan. 9, 1940 |
| 2,327,245 | Bridge | Aug. 17, 1943 |
| 2,560,864 | Hettinger | July 17, 1951 |